(12) United States Patent
Harrang et al.

(10) Patent No.: US 9,363,185 B2
(45) Date of Patent: Jun. 7, 2016

(54) METHOD AND SYSTEM FOR DETERMINING SUSTAINABLE THROUGHPUT OVER WIRELESS NETWORKS

(71) Applicant: OPANGA NETWORKS, INC., Seattle, WA (US)

(72) Inventors: Jeffrey P. Harrang, Sammamish, WA (US); David Gibbons, Redmond, WA (US); John M. Burnette, Seattle, WA (US)

(73) Assignee: OPANGA NETWORKS, INC., Seattle, WA (US)

( * ) Notice: Subject to any disclaimer, the term of this patent is extended or adjusted under 35 U.S.C. 154(b) by 150 days.

(21) Appl. No.: 13/941,379

(22) Filed: Jul. 12, 2013

(65) Prior Publication Data

US 2014/0105019 A1 Apr. 17, 2014

Related U.S. Application Data

(60) Provisional application No. 61/800,790, filed on Mar. 15, 2013, provisional application No. 61/715,039, filed on Oct. 17, 2012.

(51) Int. Cl.
| | |
|---|---|
| *H04W 4/00* | (2009.01) |
| *H04L 12/815* | (2013.01) |
| *H04L 12/26* | (2006.01) |
| *H04L 29/08* | (2006.01) |
| *H04L 29/06* | (2006.01) |
| *H04L 12/24* | (2006.01) |

(52) U.S. Cl.
CPC ............ *H04L 47/22* (2013.01); *H04L 43/0888* (2013.01); *H04L 41/0806* (2013.01); *H04L 41/142* (2013.01); *H04L 67/10* (2013.01); *H04L 69/165* (2013.01)

(58) Field of Classification Search
CPC .......................................................... H04L 47/22
USPC .......................................................... 370/235
See application file for complete search history.

(56) References Cited

U.S. PATENT DOCUMENTS

| | | | |
|---|---|---|---|
| 6,970,430 B2 | 11/2005 | Guven et al. | |
| 7,710,906 B2 | 5/2010 | Kawada | |
| 2005/0283809 A1 | 12/2005 | Kim | |
| 2007/0078956 A1* | 4/2007 | VanGompel | 709/220 |
| 2009/0024634 A1* | 1/2009 | Harrang et al. | 707/10 |
| 2009/0086634 A1* | 4/2009 | Kwan et al. | 370/235.1 |
| 2009/0164603 A1 | 6/2009 | Harrang et al. | |
| 2009/0271538 A1* | 10/2009 | Labute et al. | 710/33 |
| 2011/0141922 A1* | 6/2011 | Kotrla | H04L 12/2697 370/252 |
| 2013/0095806 A1* | 4/2013 | Salkintzis et al. | 455/414.3 |

FOREIGN PATENT DOCUMENTS

EP 1667392 A1 7/2006

OTHER PUBLICATIONS

International Search Report for PCT/US2013/065058, filed Oct. 15, 2013.

* cited by examiner

*Primary Examiner* — Farah Faroul

(57) ABSTRACT

Sustainable average data throughput rates for data transfer between a sender and a receiver are determined for a network in a steady-state condition. Delivery performance for data transferred in non-steady-state conditions is disregarded in determining sustainable average data throughput rates. The rates may be used to adapt file delivery to network conditions.

20 Claims, 12 Drawing Sheets

METHOD AND SYSTEM FOR DETERMINING SUSTAINABLE THROUGHPUT OVER WIRELESS NETWORKS

CROSS REFERENCE TO RELATED APPLICATIONS

This application claims the benefit of U.S. Provisional Patent Application No. 61/715,039, filed on Oct. 17, 2012, and U.S. Provisional Patent Application No. 61/800,790, filed on Mar. 15, 2013, which are incorporated herein by reference.

BACKGROUND

Many computer networks in existence today communicate through the transfer of data. Some examples include networks that can function independently (e.g., as Local Area Networks or LANs) or collectively as part of a group of interconnected networks (e.g., Wide Area Networks or WANs), such as the World Wide Web. Some of these networks include technologies that facilitate relatively fast, high data-rate transmissions (e.g., wired, fiber-optic, cable, and Digital Subscriber Line networks). Others facilitate slower data-rate transmissions (e.g., 3G cellular networks).

Regardless of the nature of a network and its components, networks that transfer data are susceptible to congestion or degradation in transferring data between or among network nodes. Data, often broken up and transferred in smaller data segments, partitions, or packets, can be lost in congested networks. Network congestion generally refers to a state of data transfer overload between links in a data communications network. A congested network may be experiencing a load that burdens network capacity, making it difficult to carry additional load.

Estimation of end-to-end link speed for data delivery is therefore important to computer networks to understand the capacity of the network at any given time. Examples include methods of determining end-to-end throughput performance that involve timing the delivery of a data burst (i.e., one or more data packets sent over the same link during a transmission) from sender to receiver. Unfortunately, such methods may be subject to conditions that may distort the measurements, including flow control mechanisms and lower layer protocols.

BRIEF SUMMARY OF THE INVENTION

Embodiments are related to the field of computer networks and communications over computer networks, including communications over wireless networks. In an embodiment, sustainable average data throughput rates for data transfer between a sender and a receiver are determined for a network operating in a steady-state throughput configuration (or "steady-state throughput condition"). Delivery performance for data transferred in non-steady-state conditions is disregarded in determining sustainable average data throughput rates. The rates may be used to adapt file delivery to network conditions.

According to an embodiment, a method of setting a data transfer characteristic based on a calculated steady-state throughput rate comprises sending at least one data pre-burst to a receiving system until a steady-state throughput condition is reached between a sending system and the receiving system, the data pre-burst including a first file segment of a file to be sent from the sending system to the receiving system; sending at least one data measurement burst to the receiving system by the sending system after the steady-state throughput condition has been reached, the data measurement burst including a second file segment of the file; calculating a steady-state throughput rate based on the data measurement burst sent during the steady-state throughput condition; and setting a data transfer characteristic based on the calculated steady-state throughput rate for sending a third file segment of the file.

In an embodiment, the method of setting a data transfer characteristic based on a calculated steady-state throughput rate may further comprise determining whether or not a connection timeout has occurred; and sending an initial data segment to establish a channel connection if it is determined that the connection timeout has occurred.

In an embodiment, the method of setting a data transfer characteristic based on a calculated steady-state throughput rate may further comprise setting a time duration to reach the steady-state throughput condition, wherein the data pre-burst is sent until the time duration is reached. In some embodiments, the sending system sends the first and second data pre-bursts if a transmission time for the first data pre-burst is less than the time duration to reach steady-state throughput condition, and the first data pre-burst includes the first file segment of the file, and the second data pre-burst includes a fourth file segment of the file. In some embodiments, the time duration to reach steady state throughput condition is obtained from a configuration file.

In an embodiment, in the method of setting a data transfer characteristic based on a calculated steady-state throughput rate, the data transfer characteristic is a wait interval between transfers of data bursts. In some embodiments, the method further comprises calculating an updated steady-state throughput rate when the wait interval exceeds a maximum time between transfers of data bursts.

In embodiments, in the method of setting a data transfer characteristic based on a calculated steady-state throughput rate, the initial data segment is sent over a channel establishment period. In some embodiments, the channel establishment period is obtained from a configuration file.

In an embodiment, in the method of setting a data transfer characteristic based on a calculated steady-state throughput rate, the initial data segment is at least 16 kBytes In an embodiment, in the method of setting a data transfer characteristic based on a calculated steady-state throughput rate, each file segment is at least 16 kBytes.

According to an embodiment, a method of setting a data transfer characteristic based on a calculated steady-state throughput rate comprises receiving at least one data pre-burst from a sending system until a steady-state throughput condition is reached between the sending system and a receiving system, the data pre-burst including a first file segment of a file to be sent from the sending system to the receiving system; receiving by the receiving system at least one data measurement burst from the sending system after the steady-state throughput condition has been reached, the data measurement burst including a second file segment of the file; calculating a steady-state throughput rate based on the data measurement burst sent during the steady-state throughput condition; and setting a data transfer characteristic based on the calculated steady-state throughput rate for receiving a third file segment of the file.

In an embodiment, the method of setting a data transfer characteristic based on a calculated steady-state throughput rate may further comprise determining whether or not a connection timeout has occurred; and receiving an initial data segment to establish a channel connection if it is determined that the connection timeout has occurred. In an embodiment, the method may further comprise setting a time duration to reach the steady-state throughput condition, wherein the data pre-burst is sent until the time duration is reached.

According to an embodiment, an apparatus for determining steady-state throughput data transfer rates comprises a sending system having a non-transitory computer readable medium with computer executable instructions stored thereon which, when executed, performs a method including sending at least one data pre-burst to a receiving system until a steady-state throughput condition is reached between the sending system and the receiving system, the data pre-burst including a first file segment of a file to be sent from the sending system to the receiving system; sending at least one data measurement burst to the receiving system by the sending system after the steady-state throughput condition has been reached, the data measurement burst including a second file segment of the file; calculating a steady-state throughput rate based on the data measurement burst sent during the steady-state throughput condition; and setting a data transfer characteristic based on the calculated steady-state throughput rate for sending a third file segment of the file. In embodiments, the method performed when instructions are executed by the processor includes determining whether or not a connection timeout has occurred; and receiving an initial data segment to establish a channel connection if it is determined that the connection timeout has occurred. In embodiments, the method performed when instructions are executed by the processor includes setting a time duration to reach the steady-state throughput condition, wherein the data pre-burst is sent until the time duration is reached.

According to an embodiment, an apparatus for determining steady-state throughput data transfer rates comprises a receiving system having a non-transitory computer readable medium with computer executable instructions stored thereon which, when executed, performs a method including receiving at least one data pre-burst from a sending system until a steady-state throughput condition is reached between the sending system and a receiving system, the data pre-burst including a first file segment of a file to be sent from the sending system to the receiving system; receiving by the receiving system at least one data measurement burst from the sending system after the steady-state throughput condition has been reached, the data measurement burst including a second file segment of the file; calculating a steady-state throughput rate based on the data measurement burst sent during the steady-state throughput condition; and setting a data transfer characteristic based on the calculated steady-state throughput rate for receiving a third file segment of the file. In embodiments, the method performed when instructions are executed by the processor includes setting a time duration to reach the steady-state throughput condition, wherein the data pre-burst is sent until the time duration is reached.

According to an embodiment, a networked system comprises a sending system having a processor and a memory; a receiving system having a processor and a memory; a communication network having a plurality of network resources that couples the sending system and the receiving system in the communication network; and a non-transitory computer readable medium with stored computer executable instructions. When the instructions are executed by the processor they perform a method including receiving at least one data pre-burst from a sending system until a steady-state throughput condition is reached between the sending system and a receiving system, the data pre-burst including a first file segment of a file to be sent from the sending system to the receiving system; receiving by the receiving system at least one data measurement burst from the sending system after the steady-state throughput condition has been reached, the data measurement burst including a second file segment of the file; calculating a steady-state throughput rate based on the data measurement burst sent during the steady-state throughput condition; and setting a data transfer characteristic based on the calculated steady-state throughput rate for receiving a third file segment of the file.

DETAILED DESCRIPTION OF THE INVENTION

Embodiments disclosed herein relate to an apparatus and method for determining a steady-state data throughput rate between a sender and a receiver. The steady-state data throughput between a sender and a receiver is determined by timing the delivery performance for a segment of data when the network link is at or near its sustainable capacity. The apparatus and method can take into account potential distortion effects from flow control or similar protocols. The apparatus and method may also take into account computer networks that use separate, logical or physical, access channels to send data segments, particularly those in which the determination of the channel to be employed depends on the size of the data burst. Embodiments improve the likelihood of isolating and measuring the transfer of a data segment in an interval in which the network is performing at or near steady-state throughput capacity. This allows a more precise measurement reflecting an estimated steady-state throughput, and the client receiving the information may use the information to adapt to any congestion in the network.

Figure 1:
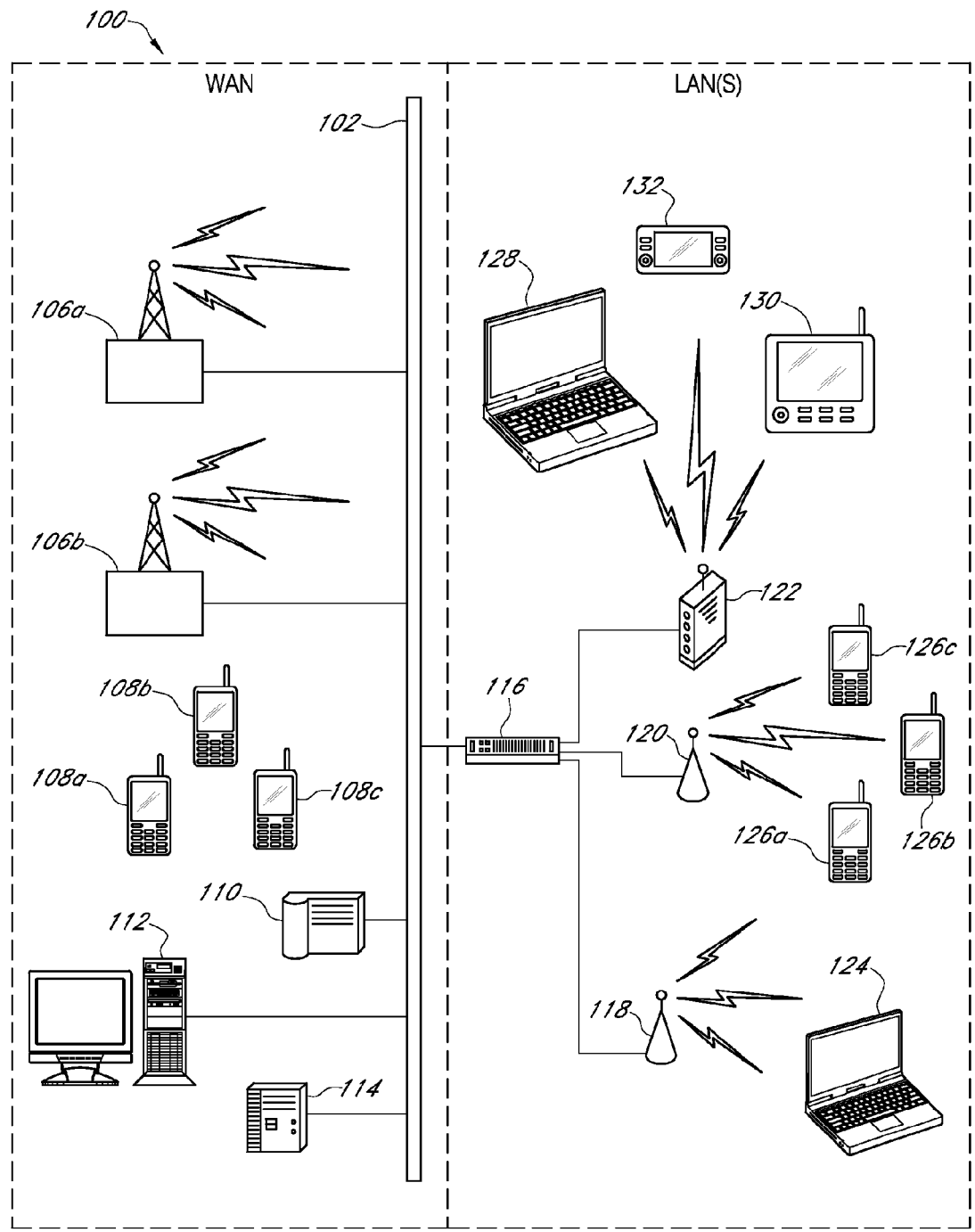
FIG. 1 illustrates a networked computing system including various wireline and wireless computing devices according to an embodiment.

FIG. 1 illustrates a networked computing system 100 including various wireline and wireless computing devices that may be utilized to implement any of the network traffic and radio communications quality monitoring or data content transfer optimization processes associated with various embodiments of the present invention. The specific network configuration shown in FIG. 1 is intended to provide an example of a high-level computing system capable of facilitating various network communications processes of embodiments disclosed herein. Network configuration and topology changes could be made to the networked computing system 100 of FIG. 1, without departing from the spirit and scope of the present disclosure.

In an embodiment, the networked computing system 100 includes a group of service provider devices (SPDs) 110, 112 and 114; a data communications network 102; a variety of wireless or mobile user equipment 108a-108c; one or more devices to facilitate data communications, 106a, 106b, 116, 118, 120 and 122; and one or more local user equipment, 124, 126a-126c, 128, 130 and 132. In addition to the components described above, the networked computing system 100 may include other types of network components according to various implementations.

A group of service provider devices may include server computers (e.g., network controller devices) or any other common network device, such as routers, gateways, or switch devices, which can support network resource allocation and/or digital data communications services to various user equipment (e.g., any of terminal devices 108a-108c, 124, 126a-126c, 128, 130 and 132) within the networked computing system 100. A data communications network 102 includes Wide Area Network (WAN), Local Area Networks (LANs), and portions thereof.

A variety of remote user equipment may include cellular phone (or mobile devices) 108a-108c along with any other variety of portable wireless computing device well known in the art (e.g., smartphones, tablets, computers, netbooks, electronic book devices, handheld gaming units, personal music players, video recorders, WI-FI™ devices, etc.). The remote user equipment may be connected to the data communications network 102 utilizing one or more wireless base stations 106a-106b, or any other common wireless or wireline network communications technology.

One or more network gateways, routers, or switch devices 116 facilitate data communications processes, within the LANs, and between the LANs and the WAN of the data communications network 102.

One or more user equipment 108a-108c, 124, 126a-126c, 128, 130 and 132 can be wirelessly connected to one or more local or remote network base stations 106a-106b, 118, 120, and 122, or optionally directly or indirectly connected to a backhaul portion of the network (e.g., to data communications network 102) via any common wireline or wireless communications technology. The user equipment includes laptop computers 124 and 128, wireless mobile devices (or phones) 108a-108c, 126a-126c, electronic book devices 130, handheld gaming units 132, personal music players, video recorders, Wi-Fi devices, or the like.

In an embodiment, any of the SPDs 110, 112, and 114 (including any of the network base stations 106a, 106b, 118, 120, and 122), the router, gateway, or switch device(s) 116, or any of the remote or local user equipment 108a-108c, 124, 126a-126c, 128, 130, and 132, may be configured to run any known operating system, including but not limited to, MICROSOFT®, WINDOWS®, MAC OS®, LINUX®, UNIX®, GOOGLE® CHROME®, or any common mobile operating system, including APPLE® IOS®, WINDOWS PHONE®, MOBILE LINUX®, GOOGLE® ANDROID®, etc.

In an embodiment, any of the SPDs 106a, 106b, 110, 112, 114, 116, 118, 120, and 122 may employ any number of common server, desktop, laptop, and personal computing devices. In an embodiment, the user equipment 108a-108c, 124, 126a-126c, 128, 130, and 132 may include any combination of common mobile computing devices (e.g., laptop computers, netbook computers, cellular phones, PDAs, handheld gaming units, electronic book devices, personal music players, video recorders, etc.), having wireless communications capabilities employing any common wireless data commutations technology, including, but not limited to: Wi-FI™, WIMAX™, GSM™, UMTS™, LTE™, LTE Advanced™ etc.

In an embodiment, the LANs or the WAN portions of the data communications network 102 may employ any of the following common communications technologies: optical fiber, coaxial cable, twisted pair cable, Ethernet cable, and powerline cable, along with any wireless communication technology known in the art. In an embodiment, any of the SPDs 110, 112, and 114, including any of the network base stations 106a, 106b, 118, 120, and 122, the router, gateway, switch device(s) 116, or any of the remote or local user equipment 108a-108c, 124, 126a-126c, 128, 130, and 132, may include any standard computing software and hardware necessary for processing, storing, and communicating data amongst each other within the networked computing system 100. The computing hardware realized in any of the data networked computing system 100 computing devices 106a, 106b, 108a-108c, 110, 112, 114, 116, 118, 120, 122, 124, 126a-126c, 128, 130, and 132 may include one or more processors, volatile and non-volatile memories, user interfaces, transcoders, and wireline and/or wireless communications transceivers, etc.

In an embodiment, any of the SPDs 110, 112, and 114 (including any of the network base stations 106a, 106b, 118, 120, and 122), the router, gateway, switch device(s) 116, or any of the remote or local user equipment 108a-108c, 124, 126a-126c, 128, 130, and 132, may be configured to include one or more computer-readable media (e.g., any common volatile or non-volatile memory type) encoded with a set of computer readable instructions, which when executed, performs a portion of one or more of the network traffic and radio communications quality monitoring or data content transfer optimization processes associated with various embodiments described herein.

Figure 2:
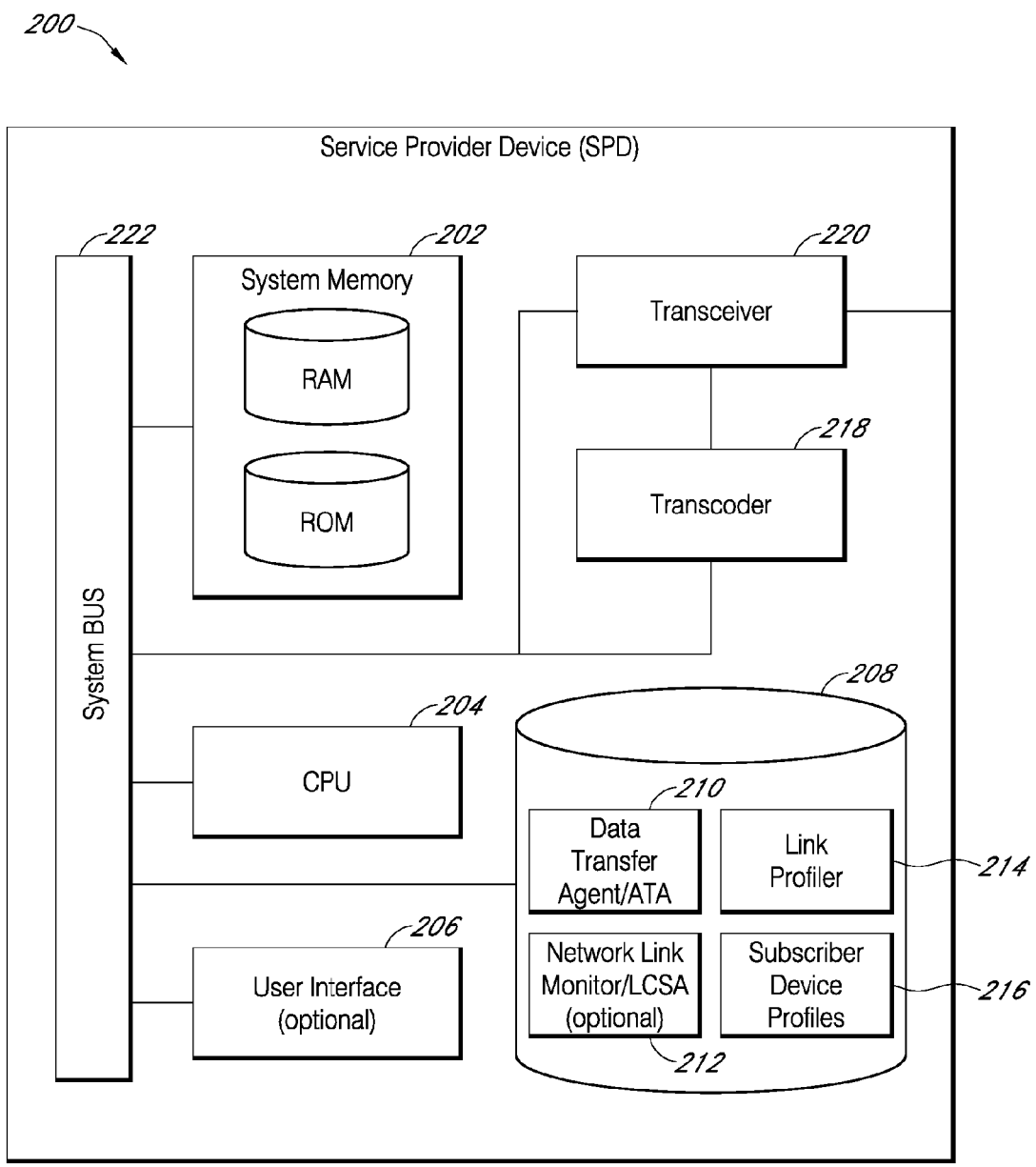
FIG. 2 shows a block diagram view of a service provider device according to an embodiment.

FIG. 2 shows a block diagram view of an SPD 200 according to an embodiment. The SPD may be representative of any of the remote service provider devices SPDs 110, 112, and 114 (including the network base stations 106a, 106b, 118, 120, and 122), and the router, gateway, switch device(s) 116 of FIG. 1. The SPD 200 may include, but is not limited to, one or more processor devices including a central processing unit (CPU) 204. In an embodiment, the CPU 204 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 204 executes computer programs stored on the SPD's 200 volatile (RAM) and nonvolatile (ROM) system memories, 202 and 208.

The SPD 200 may also include an optional user interface 206 that allows a service provider administrator to interact with the device's software and hardware resources; a software/database repository 208; a transceiver 220 for transmitting and receiving network data communications amongst various network user equipment (e.g., any of devices 108a-108c, 124, 126a-126c, 128, 130, and 132) and SPDs (e.g., any of SPDs 106a, 106b, 110, 112, 114, 118, 120, 122, and 116) utilizing the data communication network 102 of the networked computing system 100; a transcoder 218 for formatting data communications prior to transfer; and a system bus 222 that facilitates data communications amongst all the hardware resources of the SPD 200.

The software/database repository 208 of SPD 200 can include a data transfer agent 210 (also referred to herein as an adaptive throttling agent or ATA) that may facilitate real time adjustment of data transfer rates based on comparisons of maximum link throughput to actual link throughput received from one or more user equipment (as a feedback) or from a local or external link capacity monitor. Software/database repository 208 of SPD 200 can also include a link profiler 214 that is capable of determining a current throughput capacity for a series of network links between a sender and a receiver, and a subscriber device profiles database 216 that is able to store user equipment profile and resident exhaustible resource information (information pertaining to battery power, processor usage, available memory, etc.). Furthermore, software/database repository 208 of SPD 200 can include an optional network link monitor 212 that may be capable of monitoring actual link throughput for particular network links of interest (also referred to herein as a link capacity sensing agent or LCSA).

Figure 3:
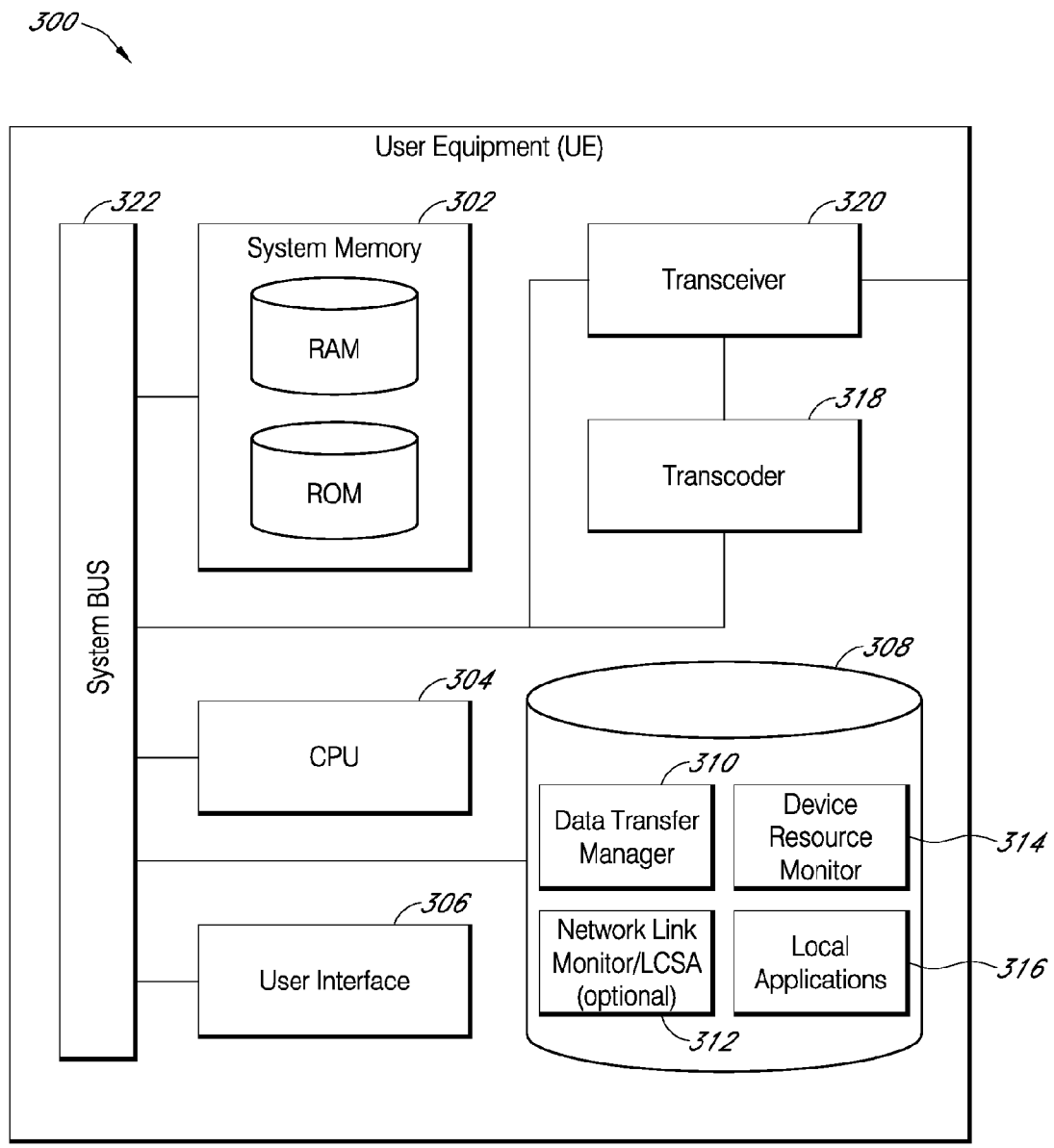
FIG. 3 shows a block diagram view of a user equipment according to an embodiment.

In accordance with an embodiment, data transfer may take place between sending and receiving devices, (e.g., an SPD 200, a media content provider, or a user equipment 300 as shown in FIG. 3). The data transfer agent 210 of SPD 200 may be logically linked to the link profiler 214 and to either the optional network link monitor 212, or alternatively to the external network link monitor component 312 of user equipment 300. The data transfers between a sender and receiver device may be optimally managed, for example, by throttling a data transfer rate, or by selecting preferred periods for data content delivery. Such management of data transfers between a sender and receiver may be based on real time evaluations of network traffic for communications links that are part of the communications path between, and optionally including, the sending and receiving devices.

FIG. 3 shows a block diagram view of a user equipment 300 according to an embodiment. The user equipment may be representative of any of the user equipment terminals 108a-108c, 124, 126a-126c, 128, 130, and 132 in FIG. 1. The user equipment 300 may include, but is not limited to, one or more processor devices including a central processing unit (CPU) 304. In an embodiment, the CPU 304 may also include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 304 is responsible for executing computer programs stored on the user equipment's 300 volatile (RAM) and non-volatile (ROM) system memories, 302 and 308.

The user equipment 300 may also include, but is not limited to, a user interface 306 that allows a user to interact with its software and hardware resources; a software/database repository 308; a transcoder 318 for formatting data communications prior to transfer; a transceiver 320 for transmitting and receiving network communications amongst other network user equipment (e.g., any of user equipment 108a-108c, 124, 126a-126c, 128, 130, and 132), media content providers, and SPDs (e.g., any of SPDs 106a, 106b, 110, 112, 114, 116, 118, 120, and 122) utilizing the data communication network 102 of the networked computing system 100; and a system bus 322 that facilitates data communications amongst all the hardware resources of the user equipment 300.

Software/database repository 308 can include a data transfer manager 310 that facilitates communications amongst the user equipment 300, various SPDs (e.g., any of SPDs 106a, 106b, 110, 112, 114, 116, 118, 120, and 122), network service providers (e.g., media content providers), as well as other user equipment (e.g., any of user equipment 108a-108c, 124, 126a-126c, 128, 130, and 132) utilizing the data communication network 102 of the networked computing system 100; a network link monitor 312 that may be capable of monitoring actual link throughput for particular network links of interest (also referred to herein as a link capacity sensing agent or LCSA); a device resource monitor 314 that may be capable of monitoring resident device resources (e.g., such as power supply, processing, memory, and communications resources); and a local applications repository for storing various end user applications that can allow the user equipment 300 to perform various user preferred processes utilizing resident hardware and software resources.

In an embodiment, the data transfer manager 310 is logically linked to the network link monitor 312 (or alternately to an external network link monitor), and the device resource monitor 314, such that the user equipment 300 can monitor external network link capacities as well as its resident exhaustible resources in order to affect data transfers between itself and an external computing device (e.g., an SPD 200, a media content provider, or another user equipment). In an embodiment, in response to analyzing data obtained from the user equipment's 300 network link monitor 312 and/or device resource monitor 314, a data delivery to the user equipment 300 may be optimally managed (e.g., by throttling a data transfer rate or selecting preferred periods for data content delivery). This management may be based on real time evaluations of network traffic for communications links that are part of the communications path between (and optionally including) sending and receiving devices (e.g., an SPD 200, a media content provider, or the user equipment 300). Examples of management and network traffic evaluations can be found in U.S. Pat. No. 7,500,010, ADAPTIVE FILE DELIVERY SYSTEM AND METHOD, Harrang et al., issued on Mar. 3, 2009; U.S. Pat. No. 8,019,886, SYSTEMS AND METHODS FOR ENHANCED DATA DELIVERY BASED ON REAL TIME ANALYSIS OF NETWORK COMMUNICATIONS QUALITY AND TRAFFIC, Harrang et al., issued on Sep. 13, 2011; and U.S. patent application Ser. No. 12/395,485, ADAPTIVE FILE DELIVERY SYSTEM AND METHOD Harrang et al., filed Feb. 27, 2009, all of which are incorporated herein by reference. Although in this disclosure, many embodiments are described as using a wireless network in a networked computer system, embodiments are not limited to wireless networks. Embodiments may also be practiced in networked computer systems using wired networks, or in a combination of wired and wireless networks, and in other types of networks and links between endpoints (e.g., wired or fiber backhaul, and coaxial cable).

In an embodiment, user equipment 300 may request a delivery from a media content provider (a sender device) for a large media content file (e.g., a media content relating to music, a movie, a TV show, a software application, an e-book, a podcast, etc.) to their wireless device 300 using a specific wireless communications protocol using lower protocol layers (discussed below). One or more network devices (e.g., user equipment 300 or SPDs 200) employing the communications protocol may sense a state of network channel congestion (e.g., using a network link monitor 212 or 312). The congestion state may be determined, for example, by monitoring the performance of the media content file delivery over one or more network specific segments (e.g., by measuring/analyzing one or more network communications metrics) in the end-to-end link, measuring a peak, or best achievable, end-to-end link throughput performance for the combined network segments (e.g., with a receiver device, such as user equipment 300), and then comparing individual segment throughput with peak end-to-end link throughput. In this manner, network congestion can be detected (via the comparison).

Figure 4:
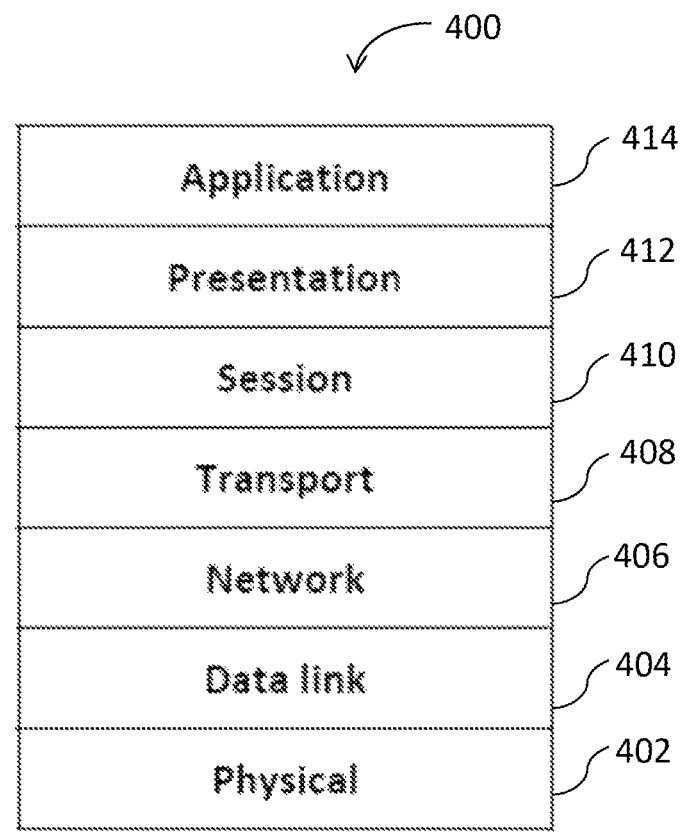
FIG. 4 illustrates a schematic of the Open Systems Interconnection (OSI) network communications protocol stack.

FIG. 4 illustrates a schematic of the Open Systems Interconnection (OSI) network communications protocol stack 400. The stack 400 includes a physical layer 402, a data link layer 404, network layer 406, a transport layer 408, a session layer 410, a presentation layer 412, and an application layer 414. The session, presentation and application layers 410-414 are generally referred to as the upper protocol layers (or upper application layers) and correspond to the application layer of the Transmission Control Protocol and Internet Protocol (TCP/IP). The transport layer 408 of the OSI stack corresponds to the transport layer of the TCP/IP protocol stack. The transport layer 408 and the underlying layers 402-406 are generally referred to as the lower protocol layers.

The Transmission Control Protocol (TCP) acknowledgment (ACK) is part of a lower layer communications protocol that sends an acknowledgment that data has been received by a receiver. The TCP ACK notification may be used by a sending system to determine the amount of time it took to deliver the data. In turn, this measurement may be used to calculate the rate of throughput for the data. Over a longer period of data transmission, which can range from seconds to minutes, a system can determine a sustainable average rate that indicates the state of the network, in contrast to transient delivery rates for periods of transmission less than one second long. Unfortunately, a simple rate calculation, based on the size of a data transfer divided by the time it takes for the transfer to occur, is subject to conditions that may compromise the quality and accuracy of the throughput measurement. For example, existing lower layer communications protocols may have effects that result in inaccurate end-to-end throughput measurements.

Figure 5A:
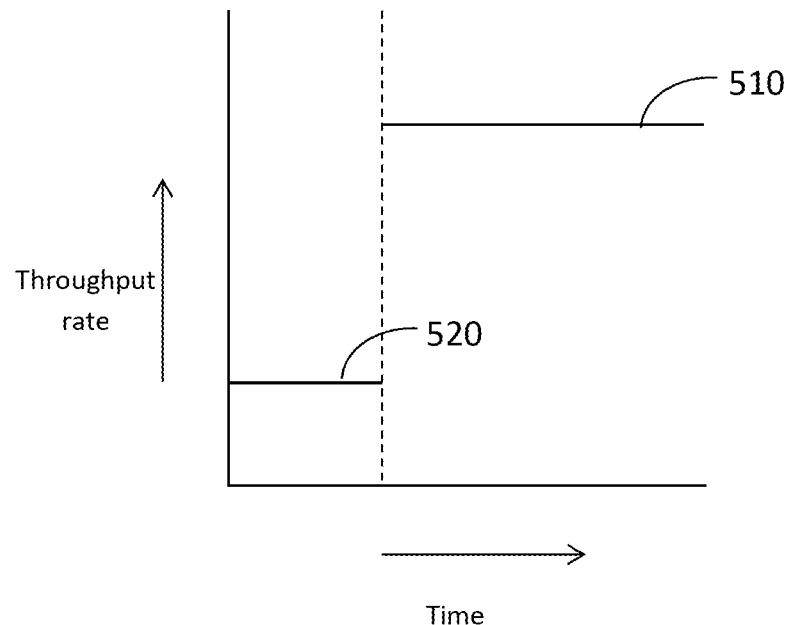
FIGS. 5A-5C illustrate potential distortion effects created by the use of the lower protocol layers.
Figure 5B:
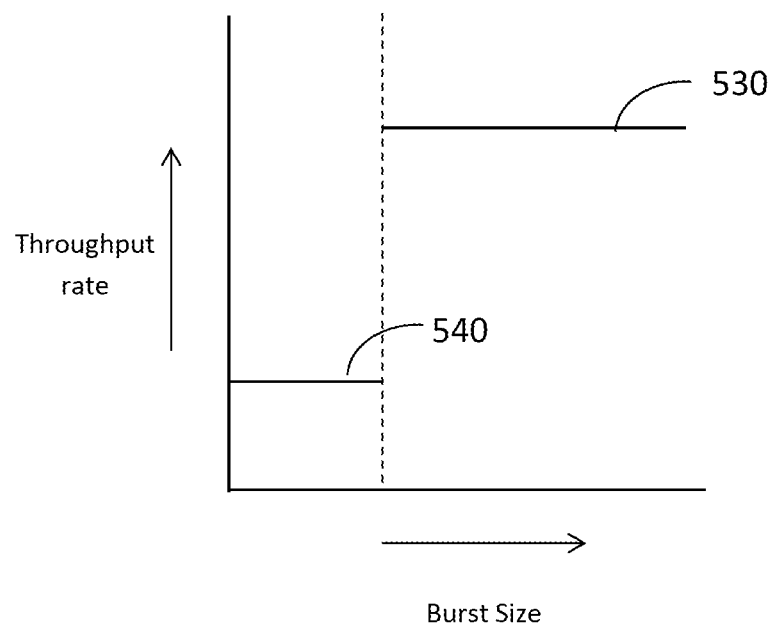
Figure 5C:
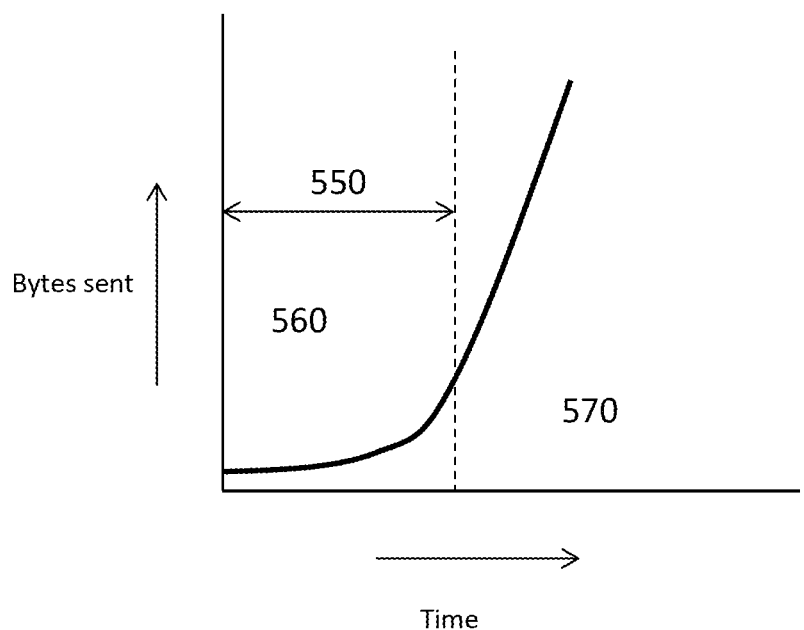

FIGS. 5A-5C illustrate potential distortion effects created by the use of the lower protocol layers 402-408 in determining the sustainable average rate of steady-state data throughput between a sender and receiver. For example, as illustrated in FIG. 5A, a network may be slow in allocating resources from an idle state so that a delay occurs at a time period 510 before a higher speed channel can be accessed at a time period 520. A slower speed communications channel may be used during the initial time period 510 because some cellular networks can take several seconds to establish a high-speed connection, and in some cellular networks it may take longer than two seconds when a radio cell is already operating at maximum concurrent capacity. Because this potential delay is not typically communicated to upper application layers, the throughput calculation may be rendered less accurate by the delay in accessing the higher speed channel at the time period 520.

In another example illustrated in FIG. 5B, in some instances existing lower level protocols direct smaller data packets to be transmitted in slower, multiple access channels. For example, in packet-switched cellular networks (e.g., universal mobile telecommunications system (UMTS™) or long-term evolution (LTE™) networks), separate radio access channels include a slower shared multiple access channel for shorter bursts of data and a dedicated high-speed channel for longer bursts of data. Smaller packet sizes may result in shorter transmission periods, and in some cases transient, non-steady-state throughput rates are provided for periods of transmission less than one second long. If the data burst size is larger, but divided into smaller packets, the initial portion of a larger data burst may see transfer of smaller packets in a slower shared multiple access channel at a time period 530, followed by an abrupt increase in rate as the data burst transfers to a higher-speed dedicated channel at a time period 540. Thus the resulting measured steady-state throughput rate may be inaccurate unless the effects from the shift in channel speed from 530 to 540 can be isolated and disregarded. Again, upper application layers typically do not receive information from lower protocol layers about the shift in channel speed, and so the application layers are unable to discount measurement of the initial portion of a larger data burst that is transferred outside of steady-state conditions.

In yet another example illustrated in FIG. 5C, a sliding window flow control protocol enforces a slow start during data transfer. IP transport-layer flow control algorithms such as TCP-ACK clocking are intended for end-to-end link speed adaptation based on timing of receiver-generated acknowledgements for each received packet. Rather than overloading the network at the start of the transfer, the algorithm operates in two basic phases: slow-start (SS) 550 and congestion avoidance (CA) 560. In the TCP-SS phase 550, smaller packets of data (e.g., packets of less than two kiloBytes in size) are sent in a window. The window size is increased each time the acknowledgment is received from the receiver. The amount of data sent increases exponentially as the window size is increased since the size of the window bounds the amount of data the sender can transmit before it is forced to wait for the next acknowledgment.

Depending on the round-trip-time (RTT) of the network, the TCP-SS phase can last for several seconds. The TCP-SS phase ends when the sender detects via TCP-ACK feedback that further increase in the size of the window does not result in further increase in the overall packet transmission rate, i.e., the network link has reached capacity. At this point the congestion avoidance (TCP-CA), or steady-state phase 560 begins where the sender attempts to maintain the rate established in TCP-SS phase. The sender may slowly probe for more capacity in a linear fashion, but once TCP-CA phase begins, the link can be said to be established in a state that represents the steady-state throughput capacity for the network link connecting sender and receiver.

Thus in methods of determining end-to-end throughput performance that involve timing the delivery of a packet burst from sender to receiver, the steady-state throughput capacity can be underestimated if the slow start phase is not disregarded from the measurement. This is particularly true in upper layer methods of estimating throughput that use TCP or similar data packet flow-control sublayer protocols. For example, application program interfaces (APIs) that communicate the TCP state to the upper layers are often lacking protocol stack implementations, making it difficult to isolate the TCP-CA phase measurements.

To account for the TCP-SS phase, a single data burst may be used to account for at least period 570. In such cases, an estimated, fixed-size, initial data burst can be used. Using a single fixed-size data burst, however, may require additional consideration. Table 1 shows data delivery rates, i.e., the amount of time required for a receiver to receive different data burst sizes at a given network connection speed.

TABLE 1

| Data Size (in kB) | Time to Deliver (in s) - 50 kbps | Time to Deliver (in s) - 1 Mbps |
|---|---|---|
| 16 | 2.6 | 0.128 |
| 32 | 5.1 | 0.256 |
| 64 | 10.2 | 0.512 |
| 128 | 20.5 | 1.024 |

TABLE 1-continued

| Data Size (in kB) | Time to Deliver (in s) - 50 kbps | Time to Deliver (in s) - 1 Mbps |
|---|---|---|
| 256 | 41.0 | 2.048 |
| 512 | 81.9 | 4.096 |
| 1024 | 163.8 | 8.192 |

For example, if the data connection is one Mega-bit per second (Mbps) and the sender sends 16 kiloBytes (kBytes) of data, then the transmission time would be about 128 milliseconds. Thus this combination of burst size and connection rate may not be long enough to cover period 570, and the combination may be insufficient to address the effects illustrated in FIGS. 5A and 5B. In addition, by nature a burst that lasts only 128 milliseconds may be sensitive to inaccuracies in timing measurement. Very short bursts typically are inaccurate estimates of steady-state throughput performance of a network.

As another example, if the data connection is fifty kilo-bit per second (kbps) and the sender sends a 256 kBytes data burst, then the transmission would take about forty-one (41) seconds. This combination of burst size and connection rate may take so long that the delay in determining the steady-state throughput rate prevents the computer system from responding to changing congestion conditions. During this period, the computer system would not be able to adjust to changing conditions, for example, by restricting the flow of data through imposing a waiting period between data requests or transfers of data segments.

Embodiments herein address non-steady state data transfer effects as illustrated in FIGS. 5A-5C, among other issues. Embodiments include methods and systems that allow upper protocol layers to measure the true steady state throughput performance in the presence of non-steady state shifts in throughput to a portion of the burst data interval that would otherwise distort the true steady-state measurement. A client software module in a sending system or a receiving system determines the steady-state throughput of the network from the sending system to the receiving system by timing the delivery performance of a file or block of data. Upper layer applications isolate the portion of the data block that is sent during the interval where the network is performing at its true steady state throughput capacity. The sending system or the receiving system is able to correctly calculate the steady state throughput and accordingly uses the information to accurately estimate the congestion present in the network.

Figure 6:
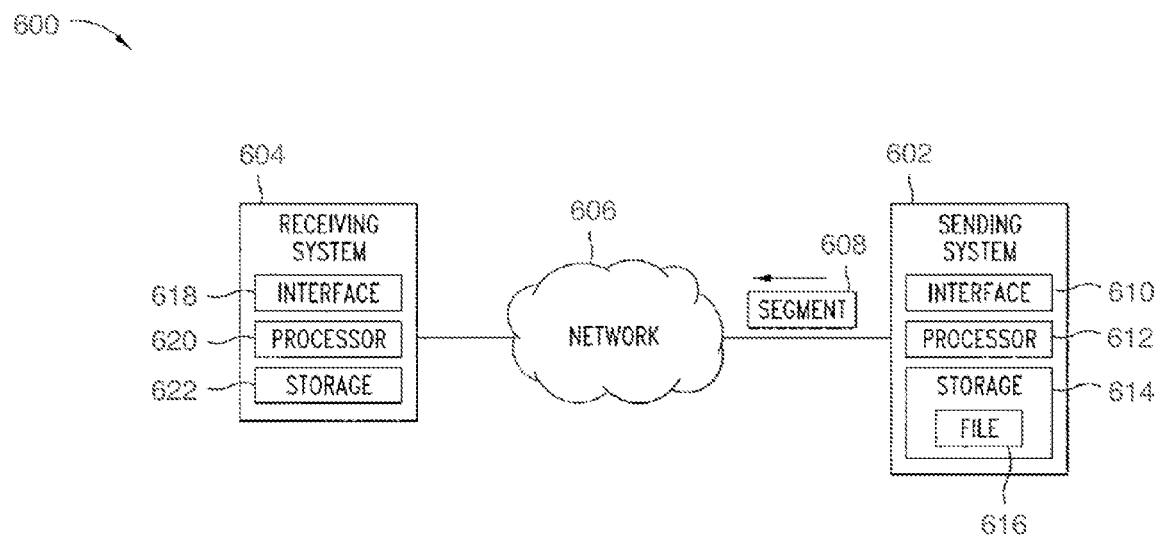
FIG. 6 illustrates a networked computer system according to an embodiment.

FIG. 6 illustrates a networked computer system 600 according to an embodiment. Computer system 600 includes a sending system 602 and a receiving system 604 both communicatively linked to a network 606. In some embodiments, the sending system 602 is an SPD 200 as described herein, a media content provider, or user equipment 300 as described herein. In some embodiments, receiving system 604 is an SPD 200 as described herein, a media content provider, or user equipment 300 as described herein. It is therefore understood that an SPD 200, a media content provider, or user equipment 300 may be either a sending system or a receiving system.

The sending system 602 includes an interface 610 to access the network 606, a processor 612, and storage 614 containing a file 616 to be transmitted over the network to the receiving system 604. Sending system 602 may include one or more modules with instructions to implement adaptive file delivery methods.

The receiving system 604 includes an interface 618 to access the network 606, a processor 620, and storage 622 to store copies of portions of the file 616 received from the sending system 602 and to store one or more modules to implement instructions regarding adaptive file delivery methods. It is understood that the sending system 602 could be located at a remote location or be located at some intermediary network location for distributing content geographically closer to a plurality of end users.

Both the sending system 602 and the receiving system 604 include a non-transitory computer readable medium as part of the storage 614 and 622, respectively, for storing information. The information includes computer executable instructions which, when executed by processors 612 and 620, respectively, perform one or more process associated with embodiments of the present invention. Thus both the sending system 602 and the receiving system 604 may perform the measurements and calculations disclosed herein, and store any measurements, variables, and results.

In an embodiment, the sending system 602 begins the transmission of a file 616 to the receiving system 604 by sending a file segment 608 over the network 606 to receiving system 604. In an embodiment, file segment 608 is a copy of a portion of the file 616. The receiving system 604 receives the file segment 608 and acknowledges the receipt of the file segment in a return acknowledgement to the sending system 602.

Figure 7:
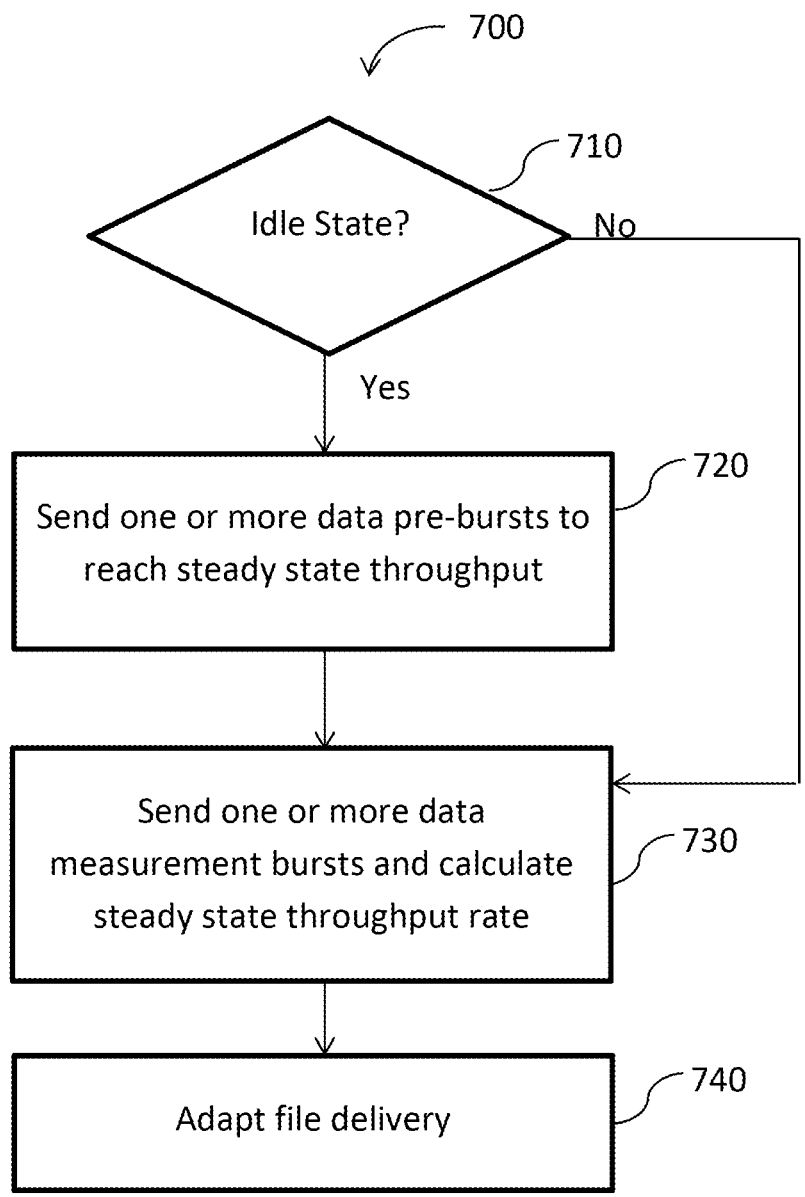
FIG. 7 illustrates a process for determining the sustainable average rate of steady-state data throughput between a sending system and a receiving system according to an embodiment.

FIG. 7 illustrates a process 700 for determining the sustainable average rate of steady-state data throughput between a sending system and a receiving system according to an embodiment. Process 700, which may be implemented in computer system 600, addresses non-steady-state transfer effects according to an embodiment. The network is referred to be in a non-steady-state if the network (e.g., the link between the sending system and the receiving system) is in a transient state that is not representative of the network's steady-state performance. At 710, the sending system, before sending data, determines whether an idle state exists. In an embodiment, the sending system checks whether a connection timeout has been reached since the last time data was sent. The connection timeout may be an indication that the network has returned to an idle state, in which non-steady-state flow control mechanisms are in force as applied to data transfers between a sending system and a receiving system over the network. For example, a computer system may reach in an idle state when one or more lower protocol layers or algorithms is prepared to apply or enforce non-steady-state flow control mechanisms, for reasons that may include the amount of time elapsed since the last packet was sent (e.g., timer expired); an undesirable amount of packet loss due to error or congestion; variation in packet delivery latency; application of a policy-based threshold trigger (e.g., minimum data throughput value); or an explicit signaling by a network element that the network has returned to idle state.

At 720, from an idle state, the sending system begins a series of one or more data pre-bursts containing one or more an initial file segments to the receiving system. Data pre-bursts may be used to establish a channel connection, for example in an embodiment including a wireless implementation. The data pre-bursts may also allow lower layer flow control protocols and algorithms to estimate channel throughput capacity and detect that a sustained burst of data is in progress. The data pre-bursts are sent until a steady state is reached.

In an embodiment, when a steady state has been reached (or shortly thereafter), the sending system at 730 sends one or more data measurement bursts following the pre-burst phase. Steady state throughput rate of the network connection between the sending system and the receiving system is calculated using these measurement bursts. In an embodiment, only the measurement bursts sent after the pre-bursts are used to calculate the steady-state throughput rate in order to obtain a more accurate estimation of the steady state throughput rate. As used herein, the term "steady-state throughput condition" or "steady-state condition refers to the condition of the network linking sender and receiver to deliver data at a constant or approximately constant throughput rate that may be sustained for a time period during which a file segment is delivered. In typical embodiments a data packet is approximately 1500 Bytes in length and a plurality of data packets form a file segment. In some embodiments a file segment is further described as a plurality of sub-segments of approximately 16 kBytes in length in order that the delivery of the file segment in steady-state condition takes place over a plurality of seconds.

If the system is not in an idle state at 710, the sending system may proceed with the transmission of one or more data measurement bursts.

At 740, the calculated steady state throughput is used to adapt file delivery. For example, in an embodiment, and as described in U.S. Pat. No. 7,500,010, ADAPTIVE FILE DELIVERY SYSTEM AND METHOD, Harrang et al., issued on Mar. 3, 2009, and incorporated herein by reference, sending and receiving systems may throttle a data transfer rate or select preferred periods for data content delivery based on a measured sustainable average throughput. By isolating the steady-state performance from the start-up phase performance, more accurate information can be obtained. The calculated steady state throughput may be used to manage data transfers between the sending system and the receiving system or for other purposes according to implementation.

Figure 8:
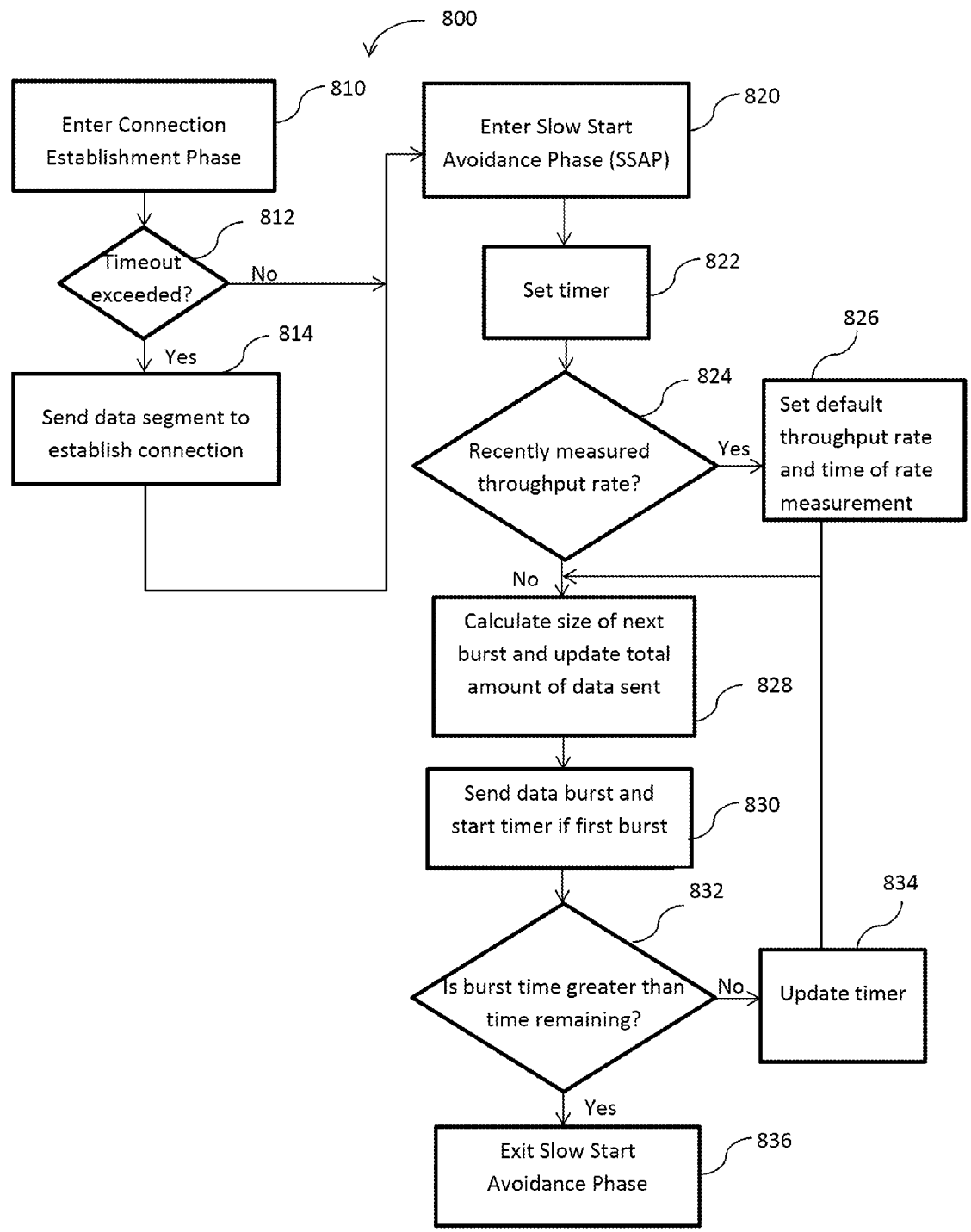
FIG. 8 illustrates a data pre-burst phase process according to an embodiment.

FIG. 8 illustrates a data pre-burst phase process 800 according to an embodiment. From an idle state, a sending system may enter the Connection Establishment (CEP) at 810. At 812, the sending system determines whether a connection timeout, or a fixed period of time between data transfers, has been reached. In an embodiment, at the time of calculation (Now), the sending system calculates $$\text{Now} - T\_\text{lastData}RX > T\_\text{noCON}_P$$

where T_lastDataRX is the time since the last data was sent and received by the receiving system, and T_noCONP is the maximum time allowed for a connection timeout. If T_noCONP is not exceeded, then the sending system may enter the Slow Start Avoidance Phase in 820.

If T_noCONP is exceeded, then the sending system sends a data segment at 814. Lower level communications protocols may deliver data bursts in small packets or segments of known size. For example, the maximum transmission unit (MTU) of a communications protocol may be relatively small, generally no more than 1500 bytes in the case of some Ethernet and wireless TCP implementations. The smaller size of this packet would not move the system out of the slower multiple access channel and into the dedicated high-speed channel, resulting in a distortion of the steady-state data transfer rate measurement.

According to an embodiment, the initial data segment may be of sufficient size to establish a connection with a higher speed wireless network connection so that steady-state throughput measurements can be facilitated. In certain embodiments, the initial data segment size is sixteen kBytes or greater. In other embodiments, the initial data segment size is less than sixteen kBytes. In yet other embodiments, the size of the initial data segment is determined from the lower layer protocol configurations known to be enforced during a wireless data transmission. The transfer of the initial data segment is not included in the determination of an average sustainable rate.

In some cases, the rate of the data connection may result in a short transmission of the initial data segment that does not overcome other network conditions (e.g., instances when the computer network may be slow in allocating resources from idle state). In such cases, more than one initial data segments may be transferred to span the duration of the Connection Establishment Phase (e.g., 510 in FIG. 5A or 530 in FIG. 5B).

In embodiments, the duration of the Connection Establishment Phase may be one second, two seconds or more than two seconds depending on the type of network and configuration of the network known in advance. In other cases, the duration of this stage may be variable and informed by the network. Examples include determining the duration by monitoring the data transfer rate, by monitoring data transfer latency, or by receiving a response from the network when queried by a sending or receiving system. In some embodiments, the number of initial data segments to be transferred may be determined from previously measured throughput rates for lower speed resources, or determined from a default rate. Thus, the duration of the initial data burst may be fixed, for example, by sending a fixed amount of data. The initial data segments transferred are not included in the determination of an average sustainable rate.

After channel resources have been established, the sending system enters the Slow Start Avoidance Phase 820 in an embodiment. At 822, the sending system sets a timer ($T_{REM}$) to the target Slow Start Avoidance Phase time period ($T_{SSA}$). The time period for the Slow Start Start Avoidance Phase may be estimated for different computer system configurations. The initial period of time can be obtained from a configuration file, or from a configuration provided by the computer system or network. In some cases, the initial period of time is dependent on an estimate of the round trip time (RTT) of the link determined from the RTT ACK clocking protocol. The period of time may optionally disregard the amount of time associated with the transfer of the initial data segment in the Connection Establishment Phase.

In some cases, $T_{SSA}$ may be a given time period, e.g., one second, based on network factors. In other cases, $T_{SSA}$ may be set at less than one second. In yet other cases, $T_{SSA}$ may be configured to be more than one second. $T_{SSA}$ may be set at the receiving system and/or the sending system; at a computer system (including the sending and receiving systems) level; or at a node within the computer system. Factors that may affect $T_{SSA}$ include the nature of the computer network; the location within a computer network; historical network performance; network operator experience; or a combination of these or similar factors.

At 824, the sending system determines whether a recently measured throughput rate has been determined. In an embodiment, where $R_{Base}$ is a rate determined during the data measurement burst phase (e.g., 730 in FIG. 7), and $T_{RBase}$ is the time when $R_{Base}$ was determined, the sending system may calculate $$\text{Now} - T_{RBase} > T_{RBase\_stale}$$

where Now is the time of calculation and $T_{RBase\_stale}$ is the maximum time allowed since the last $R_{Base}$ measurement.

If the calculated time period exceeds the maximum allowed time since the last $R_{Base}$ was measured, then the last measured rate $R_{Base}$ may be stale and the sending system sets $R_{Base}$ to a default transfer rate that can be configured at 826. For example, a default data transfer rate may be 50 kbps. In this case, the sending system sets $T_{RBase}$ to the time when $R_{Base}$ is initiated at the default transfer rate. If the calculated time period does not exceed the maximum allowed time since the last $R_{Base}$ was measured, then the last measured rate $R_{Base}$ may be used and $T_{RBase}$ is the time at which $R_{Base}$ was last measured.

In an embodiment, at 828, $R_{Base}$ is used as the basis to make an estimate of how many bytes of data to send for the data burst to span $T_{SSA}$ and reach steady state data transfer conditions. The sending system estimates the size of the data burst, $Size_{burst}$, as the greater of a minimum partition size or $$R_{Base} * T_{REM}$$

where the partition size is a configurable minimum data segment size. In certain embodiments, the partition size is sixteen kBytes or greater. In other embodiments, the partition size is less than sixteen kBytes. After the size of the data burst is determined, the sending system updates the aggregate total amount of data delivered to the receiving system (or $Size_{total}$) during the CSSAP.

At 830, the sending system sends a data burst in response to a request for $Size_{burst}$ from the receiving system. The sending system keeps track of the amount of data it sends to meet the requirements of $Size_{burst}$. In addition, the receiving system may obtain the time for the data burst delivery ($T_{burst}$), for example by measuring the start and end of the burst. If the data burst sent is the first data burst, then in an embodiment the receiving system initializes the time of the first request for the Slow Start Avoidance Phase, $T_{start}$, to the time at which the first data burst is sent.

At 832, the receiving system compares the time for the data burst ($T_{burst}$) to $T_{REM}$ (the time remaining in the slow start period):

$$T_{burst} > T_{REM}$$

If $T_{burst}$ is greater than $T_{REM}$, then the time for the data burst exceeds the time remaining in the Slow Start Avoidance Phase, which in an embodiment indicates that the time $T_{SSA}$ has been achieved and steady state conditions have been achieved. In this case, the system exits the Slow Start Avoidance Phase at 836 since it has completed the data transfer during the slow start phase.

If at 832, $T_{burst}$ is less than $T_{REM}$, $T_{REM}$ is reduced by $T_{burst}$ at 834 and then another data burst size is determined for transfer from the sending system to the receiving system. In this case, $T_{SSA}$ has not been exceeded, indicating that the sending system may not be in a steady state. In an embodiment, if multiple data bursts are required to achieve $T_{SSA}$, then the request for the next data burst is sent immediately to the sending system when the receiving system receives the previous data burst. The data bursts may be sent consecutively and without wait times inserted between requests.

Figure 9:
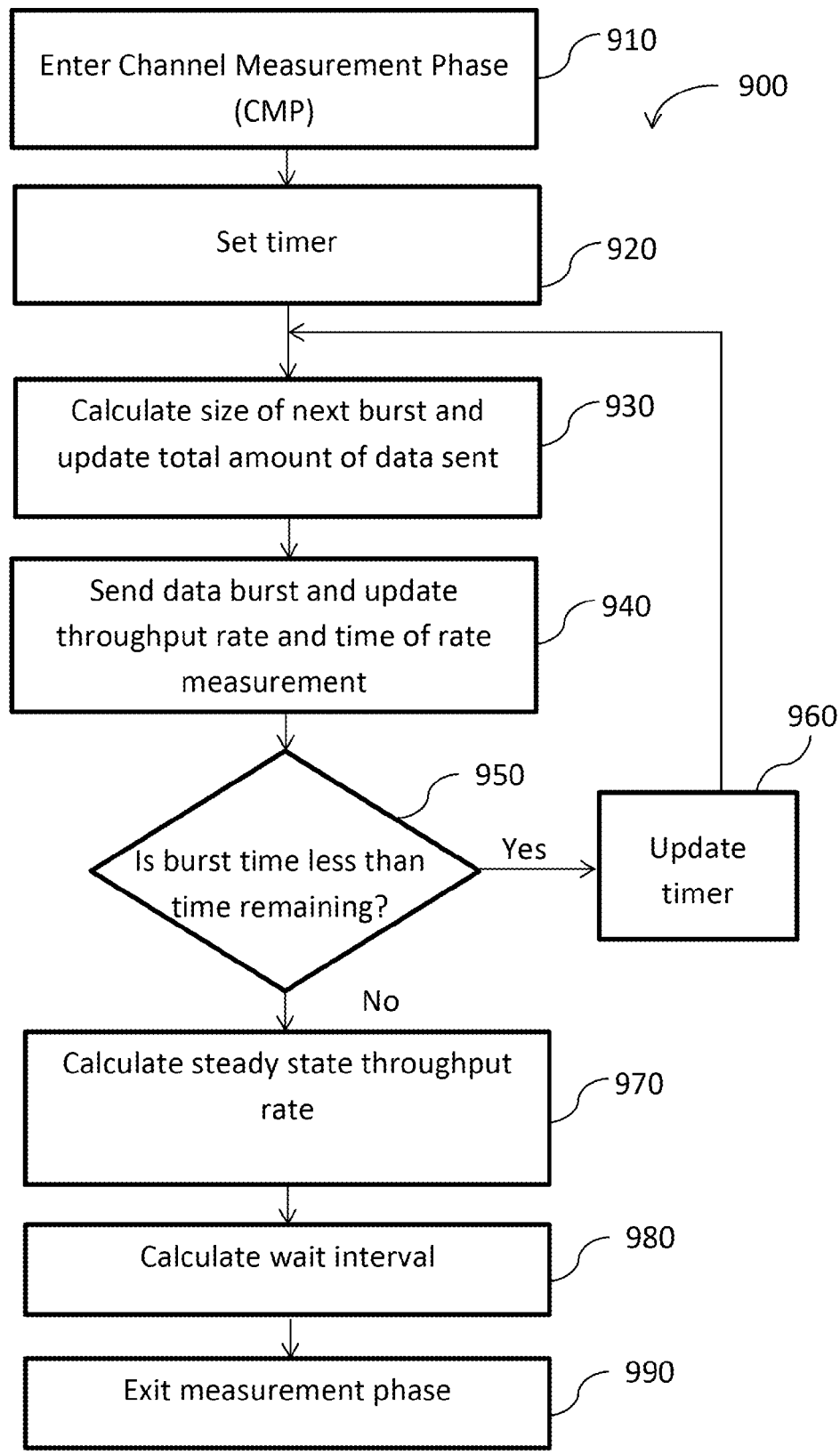
FIG. 9 illustrates a measurement phase process according to an embodiment.

FIG. 9 illustrates a measurement phase process 900 according to an embodiment. At 910, the sending system has exited the Slow Start Avoidance Phase and has entered the Channel Measurement Phase (CMP). If at 910 the preceding phase was a CMP as opposed to an SSAP, then $T_{START}$ is reset to Now. At 920, the sending system sets a timer ($T_{REM-CMP}$) to the target Channel Measurement Phase time period ($T_{CMP}$). The time period for the Channel Measurement Phase may be estimated for different computer system configurations, or may be estimated as the time required to transfer a data file at a default data transfer rate, by way of non-limiting examples. The initial period of time can be from a configuration file, or based on a configuration provided by the computer system or network. In some cases, the initial period of time is dependent on an estimate of the round trip time (RTT) of the link determined from the RTT ACK clocking protocol. The period of time may optionally disregard the amount of time associated with the transfer of the initial data segment in the Connection Establishment Phase and the Slow Start Avoidance Phase.

In an embodiment, at 930, $R_{Base}$, the most recent estimate of the steady-state throughput rate, may be used as the basis to make an estimate of how many bytes of data to send for the data burst to span $T_{CMP}$. The receiving system estimates the size of the data burst, $Size_{burst-CMP}$, as the greater of a minimum partition size or $$R_{Base} * T_{REM-CMP}$$

where the partition size is a configurable minimum data segment size. In certain embodiments, the partition size is sixteen kBytes or greater. In other embodiments, the partition size is less than sixteen kBytes. After the size of the data burst is determined, the receiving system updates the aggregate total amount of data delivered to the receiving system during the Channel Measurement Phase ($Size_{total-CMP}$).

At 940, the receiving system sends a data burst in response to a request for $Size_{burst-CMP}$ from the receiving system. The receiving system keeps track of the amount of data it sends to meet the requirements of $Size_{burst-CMP}$. In addition, the receiving system may obtain the time for the data burst delivery ($T_{burst-CMP}$), for example by measuring the start and end of the burst. If the data burst sent is the first data burst, then in an embodiment the sending system initializes the time of the first request for the Channel Measurement Phase, $T_{start-CMP}$, to the time at which the first data burst is sent in this phase.

The receiving system at 940 may also update $R_{Base}$ to the rate at which the data burst is downloaded, $R_{BURST}$, in each Channel Measurement Phase data burst cycle. Since $R_{BURST}$ is measured during the Channel Measurement Phase, it represents the latest estimate of the steady-state throughput rate. $T_{RBase}$, the time at which $R_{Base}$ was last measured, is also updated. Since the channel is expected to be in steady state, the download rate for each data burst may be used to estimate the next data burst size. This estimate is considered time sensitive and may become stale after a given interval if no further bursts are sent.

At 950, after the burst of data is sent, the receiving system compares the time for the data burst ($T_{burst-CMP}$) to $T_{REM-CMP}$:

$$T_{burst-CMP} < T_{REM-CMP} * BT$$

where BT is an optionally applied factor that reduces $T_{REM-CMP}$. In an example, BT may be a positive numerical factor of less than one. In an embodiment, for example, BT may be seven-tenths (0.7). The inclusion of BT prevents another data burst from being sent by the sending system if, in sending the data burst, $T_{burst-CMP}$ would extend substantially past the cumulative target phase time $T_{CMP}$. If $T_{burst-CMP}$ is less than $T_{REM-CMP} * BT$, then $T_{REM-CMP}$ is reduced by $T_{burst-CMP}$ at 960, and the sending system processes another data burst request from the receiving system.

If at 950, $T_{burst-CMP}$ is greater than $T_{REM-CMP} * BT$, then at 970 the receiving system calculates the overall throughput rate by determining the total time since $T_{START}$ was last set ($T_{total}$) and calculating download rate $R_{DL}$, $$R_{DL} = Size_{total} / T_{total}$$

The steady-state throughput rate may be determined from the total time since the beginning of the Channel Measurement Phase ($T_{total-CMP}$) and calculating download rate $R_{SS}$ $$R_{SS} = Size_{total-CMP} / T_{total-CMP}$$

In an implementation, this averaged steady-state throughput $R_{SS}$ is used by the sending system for flow control to calculate and enforce an average rate $R_{max}$. In subsequent data bursts, the sender can accomplish flow control by pacing the requests for subsequent bursts with wait intervals between requests. An exemplary calculation of wait interval at 980 may be as follows $$T_{wait} = (Size_{total-CMP}/R_{max}) - T_{total-CMP}$$

The overall download process will wait this amount of time ($T_{wait}$) before starting a new round after the sending system exits the measurement phase at 990. In an embodiment, if $T_{wait}$ is zero or negative, then this means that the receiver can immediately request the next packet of data. Any remaining data can be sent in bursts (e.g., at 930) without entering the Connection Establishment Phase or the Slow Start Avoidance Phase. In an example, data can be sent in bursts without re-entering slow start or measurement phases if the total wait period does not exceed lower layer protocol reset values.

Figure 10:
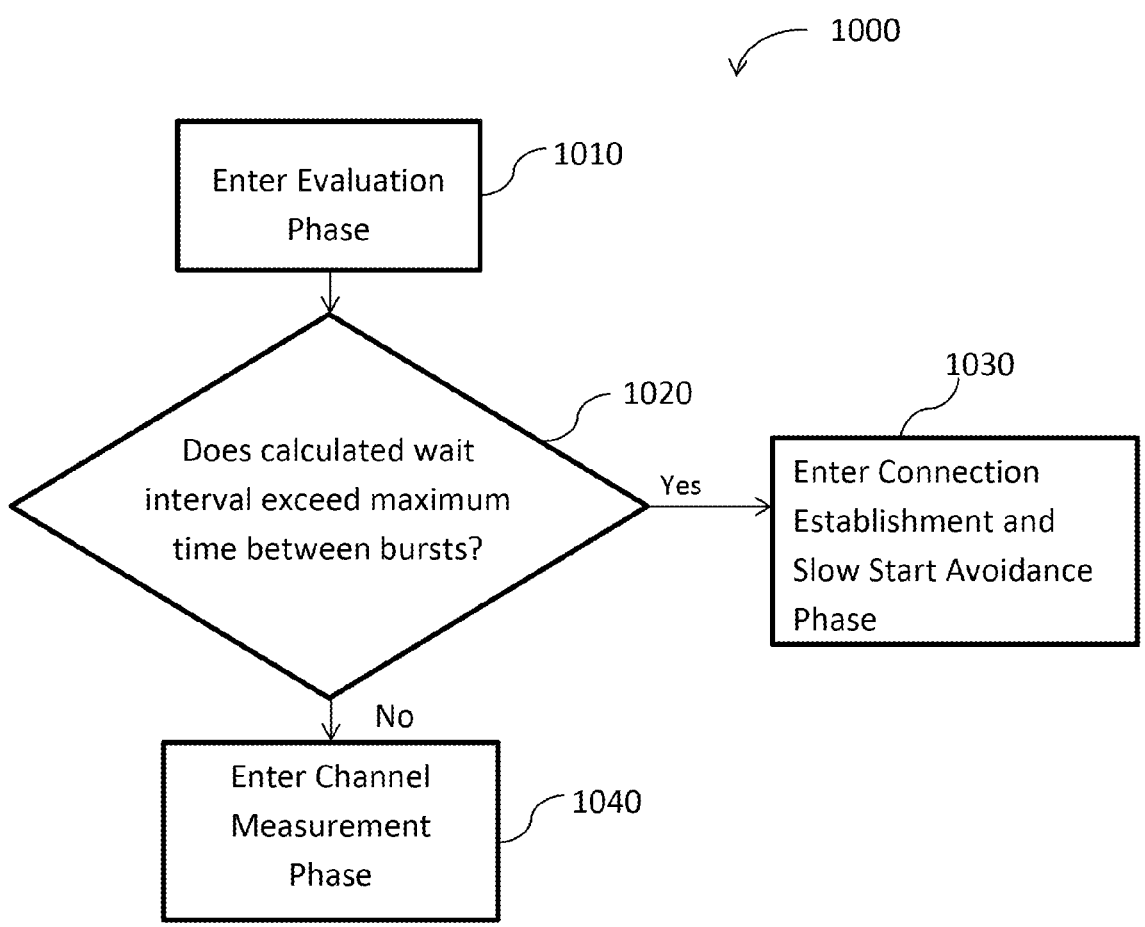
FIG. 10 illustrates an evaluation phase process according to an embodiment.

FIG. 10 illustrates an evaluation phase process 1000 according to an embodiment. At the end of measurement phase, the receiving system may enter an Evaluation Phase 1010. At 1020, the receiving system determines whether or not the wait interval $T_{wait}$ exceeds a maximum time allowed between bursts, $T_{noSSA}$, using default rules based on TCP internal timers and protocols. The receiving system also determines whether or not the wait interval $T_{wait}$ exceeds a maximum time allowed for a connection timeout, $T\_{noCONP}$, using default rules. If the wait time exceeds TCP defaults or the maximum connection timeout, the system may repeat the slow start phases by entering the Connection Establishment (when $T\_{noCONP}$ is exceeded) or Slow Start Avoidance Phase (when $T_{noSSA}$ is exceeded) at 1030. If the $T_{wait}$ does not exceed $T_{noSSA}$ or $T\_{noCONP}$, then the system may enter the Channel Measurement Phase at 1040. For example, if TCP has a retransmission timeout (RTO) value, and if the idle interval between data bursts is less than the RTO value, then TCP should not re-enter a slow start phase and proceed to 1040. In yet another example, the TCP stack may implement an algorithm to reuse the TCP state information between bursts of data with short interspersed idle intervals. This occurs in some modern TCP implementations (e.g., IETF RFC 2581). With this information, upper application layers may be able to adapt flow control to prevent an unnecessary return to a slow start phase.

Figure 11:
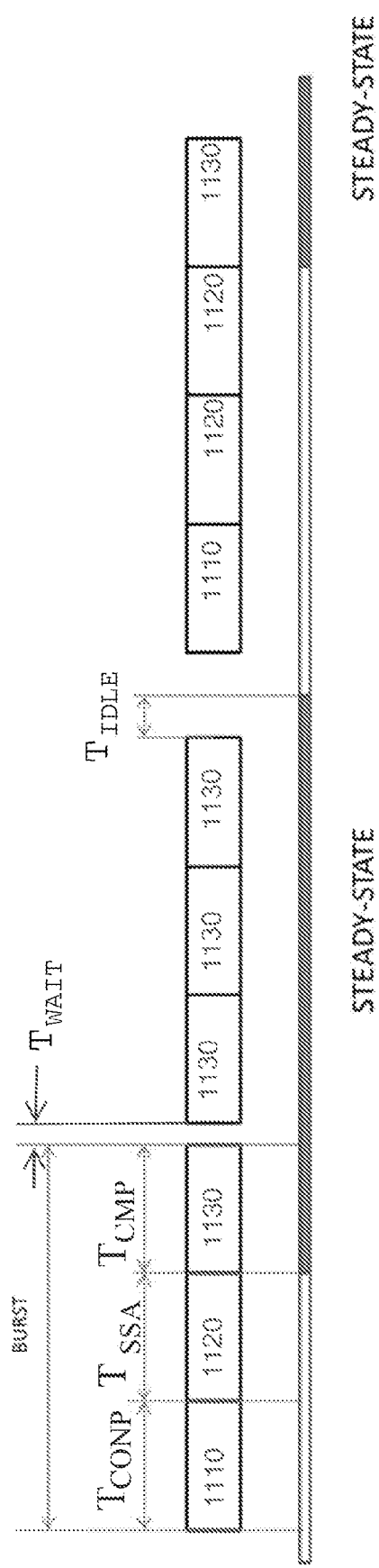
FIG. 11 illustrates data burst sequences according to an embodiment.

FIG. 11 illustrates data burst sequences according to an embodiment. A data burst may be organized into sub-bursts, which may transferred in one or more data segments, as an example. The first sub-burst 1110 is of a sufficient size to engage a higher-speed communication channel over time period $T_{CONP}$. For example, sub-burst 1110 is large enough to allow a wireless channel to transition to a high speed configuration. Next, sub-burst 1120 is sent during the slow start phase, and is of sufficient size in data Bytes (equivalent to a sufficient transmission time duration) such that the system is able to transition to its steady-state. As an example, the sub-burst 1120 allows a transport flow-control protocol, such as TCP, to move out of the slow-start phase. A final sub-burst 1130 may then be used to calculate a steady-state throughput. For example, the average steady-state throughput is determined by timing the delivery of the sub-burst 1130 in disregard of the non-steady-state sub-bursts 1110 and 1120.

In FIG. 11, following sub-bursts 1110, 1120 and 1130, the sender may initiate the sending of further data sub-bursts 1130 within a time that allows the network to remain in steady-state configuration. The transfer of data may take into account the average steady-state throughput calculated in relation to 1130, and wait times ($T_{wait}$) may be imposed between the transfers of data segments to adapt to congested conditions. No connection phase (1110) or slow start avoidance phase (1120) pre-bursts data transfers are necessary during steady-state data transfer. In embodiments, this may occur when $T_{wait}$ is less than $T_{idle}$.

If, following the steady-state data transfer, the sender sends another burst, the computer system queries whether this transfer is initiated before the expiration of a timer set since the last data transfer was received. In FIG. 11, $T_{idle}$ is the time required after data transmission has stopped, in a condition of steady-state transfer, until the network is no longer in steady-state. If time has expired and $T_{idle}$ exceeded, the next data transfer is again preceded by sub-bursts 1110 and 1120 to allow the network to transition to steady-state prior to beginning the connection measurement phase burst. The number of bursts required to achieve the connection phase or slow-start-avoidance phase or connection measurement phase times may be adjusted as illustrated by sending multiple sub-bursts. This allows the algorithm to operate over different network throughput capacities and performance levels.

While embodiments herein rely on estimates of the time duration or data size/volume criteria (or both) to model the transition of a network configuration into a steady-state, it can be understood that other methods of signaling a steady state network may also be implemented in connection with embodiments described herein. For example, in some systems, the sender or receiver could be queried or signaled by lower-layer protocols when steady-state throughput was achieved. In another an example, the sending system's operating system could provide an API that communicated the TCP congestion state so that an upper layer application could detect when slow start phase was exited (i.e., congestion-avoidance phase entered). In another example, the sender or receiver could query the status of wireless protocols and state variables that would indicate whether a wireless network was in steady-state. A wireless terminal operating system API could be used to determine which data channel type was currently in use for data transfer.

In yet another example, a network node enforcing a flow control policy could query or signal the sender or receiver when the network was in steady-state flow configuration between sender and receiver. In a further example, the sender or receiver could indirectly detect when TCP was in steady-state by querying the sender's operating system with an API for state variables that indicates that a slow-start phase was not in effect. For example, the congestion window size and rate of change in size could be queried and the TCP congestion phase could be determined. If the TCP congestion window was not geometrically increasing the flow could be inferred to be no longer in slow-start.

While several embodiments of the present invention have been illustrated and described herein, many changes can be made without departing from the spirit and scope of the invention. For example, it can be appreciated that the disclosure may be used in wireless networks, wired networks, fiber networks and coaxial networks alone, or in combination. Accordingly, the scope of the invention is not limited by any disclosed embodiment. Instead, the scope of the invention should be determined from the appended claims that follow.

What is claimed is:

1. A method comprising:
   sending at least one data pre-burst to a receiving system during a first network condition between a sending system and the receiving system, the data pre-burst including a first file segment of a file to be sent from the sending system to the receiving system, the first network condition having a data throughput rate that is below a steady-state data throughput rate for a network link coupling the receiving and sending systems;

sending at least one data measurement burst to the receiving system by the sending system during a second network condition, the data measurement burst including a second file segment of the file, the second network condition having the steady-state data throughput rate, the steady-state data throughput rate being a data throughput rate that is at or near a maximum sustainable capacity;

calculating the steady-state data throughput rate based on the data measurement burst sent during the second network condition without using any data measurement for the pre-burst during the first network condition;

setting a data transfer characteristic based on the calculated steady-state data throughput rate for sending a third file segment of the file to the receiving system; and sending the third file segment to the receiving system at a data transmission rate that is based on a third network condition between the receiving and sending systems and the data transfer characteristic defined at the setting operation.

2. The method of claim 1, further comprising:
determining whether or not a connection timeout has occurred; and
sending an initial data segment to establish a channel connection if it is determined that the connection timeout has occurred.

3. The method of claim 2, wherein the initial data segment is sent over a channel establishment period.

4. The method of claim 3, wherein the channel establishment period is obtained from a configuration file.

5. The method of claim 2, wherein the initial data segment is at least 16 kBytes.

6. The method of claim 1, further comprising:
setting a time duration to reach the second network condition,
wherein the data pre-burst is sent until the time duration is reached.

7. The method of claim 6, wherein the time duration to reach the second network condition is obtained from a configuration file.

8. The method of claim 6, wherein the sending system sends the first and second data pre-bursts if a transmission time for the first data pre-burst is less than the time duration to reach the second network condition, and
wherein the first data pre-burst includes the first file segment of the file, and the second data pre-burst includes a fourth file segment of the file.

9. The method of claim 1, wherein the data transfer characteristic is a wait interval between transfers of data bursts.

10. The method of claim 9, further comprising calculating an updated steady-state throughput rate when the wait interval exceeds a maximum time between transfers of data bursts.

11. The method of claim 1, wherein each file segment is at least 16 kBytes.

12. A method comprising:
receiving at least one data pre-burst from a sending system during a first network condition between the sending system and a receiving system, the data pre-burst including a first file segment of a file to be sent from the sending system to the receiving system, the first network condition having a data throughput rate that is below a steady-state data throughput rate for a network link coupling the receiving and sending systems;
receiving by the receiving system at least one data measurement burst from the sending system during a second network condition, the data measurement burst including a second file segment of the file, the second network condition having the steady-state data throughput rate, the steady-state data throughput rate being a data throughput rate that is at or near a maximum sustainable capacity;

calculating the steady-state data throughput rate based on the data measurement burst sent during the second network condition without using any data measurement for the pre-burst during the first network condition;

setting a data transfer characteristic based on the calculated steady-state data throughput rate for receiving a third file segment of the file; and receiving the third file segment at a data transmission rate that is based on a third network condition between the receiving and sending systems and the data transfer characteristic defined at the setting operation.

13. The method of claim 12, further comprising:
determining whether or not a connection timeout has occurred; and
receiving an initial data segment to establish a channel connection if it is determined that the connection timeout has occurred.

14. The method of claim 12, further comprising:
setting a time duration to reach the second network condition,
wherein the data pre-burst is sent until the time duration is reached.

15. An apparatus for determining steady-state throughput data transfer rates comprising:
a sending system having a non-transitory computer readable medium with computer executable instructions stored thereon which, when executed, performs a method including:
sending at least one data pre-burst to a receiving system during a first network condition between the sending system and the receiving system, the data pre-burst including a first file segment of a file to be sent from the sending system to the receiving system, the first network condition having a data throughput rate that is below a steady-state data throughput rate for a network link coupling the receiving and sending systems;
sending at least one data measurement burst to the receiving system by the sending system during a second network condition, the data measurement burst including a second file segment of the file, the second network condition having the steady-state data throughput rate, the steady-state data throughput rate being a data throughput rate that is at or near a maximum sustainable capacity;
calculating the steady-state data throughput rate based on the data measurement burst sent during the second network condition without using any data measurement for the pre-burst during the first network condition;
setting a data transfer characteristic based on the calculated steady-state data throughput rate for sending a third file segment of the file; and
sending the third file segment to the receiving system at a data transmission rate that is based on a third network condition between the receiving and sending systems and the data transfer characteristic defined at the setting operation.

16. The apparatus of claim 15, wherein the method further includes
  determining whether or not a connection timeout has occurred; and
  receiving an initial data segment to establish a channel connection if it is determined that the connection timeout has occurred.

17. The apparatus of claim 15, wherein the method further includes
  setting a time duration to reach the second network condition,
  wherein the data pre-burst is sent until the time duration is reached.

18. An apparatus for determining steady-state throughput data transfer rates comprising:
  a receiving system having a non-transitory computer readable medium with computer executable instructions stored thereon which, when executed, performs a method including:
    receiving at least one data pre-burst from a sending system during a first network condition between the sending system and a receiving system, the data pre-burst including a first file segment of a file to be sent from the sending system to the receiving system, the first network condition having a data throughput rate that is below a steady-state data throughput rate for a network link coupling the receiving and sending systems;
    receiving by the receiving system at least one data measurement burst from the sending system during a second network condition, the data measurement burst including a second file segment of the file, the second network condition having the steady-state data throughput rate, the steady-state data rate being a data throughput rate that is at or near a maximum sustainable capacity;
    calculating the steady-state data throughput rate based on the data measurement burst sent during the second network condition without using any data measurement for the pre-burst during the first network condition;
    setting a data transfer characteristic based on the calculated steady-state data throughput rate for receiving a third file segment of the file; and
    sending the third file segment to the receiving system at a data transmission rate that is based on a third network condition between the receiving and sending systems and the data transfer characteristic defined at the setting operation.

19. The apparatus of claim 18, wherein the method further includes
  setting a time duration to reach the steady-state throughput condition,
  wherein the data pre-burst is sent until the time duration is reached.

20. A networked system, comprising:
  a communication network having a plurality of network resources that couples a sending system having a processor and a memory and a receiving system having a processor and a memory; and
  a non-transitory computer readable medium with computer executable instructions stored thereon, which, when executed, performs a method including
    receiving at least one data pre-burst from a sending system until a steady-state throughput condition is reached between the sending system and a receiving system, the data pre-burst including a first file segment of a file to be sent from the sending system to the receiving system;
    receiving by the receiving system at least one data measurement burst from the sending system after the steady-state throughput condition has been reached, the data measurement burst including a second file segment of the file;
    calculating a steady-state throughput rate based on the data measurement burst sent during the steady-state throughput condition without using any data measurement for the pre-burst;
    setting a data transfer characteristic based on the calculated steady-state throughput rate for receiving a third file segment of the file, the data transfer characteristic being a wait interval between transfers of data burst; and
    calculating an updated steady-state throughput rate when the wait interval exceeds a maximum time between transfers of data bursts.

* * * * *